GOLF CART
Original Filed Aug. 21, 1964 Sheet 1 of 4
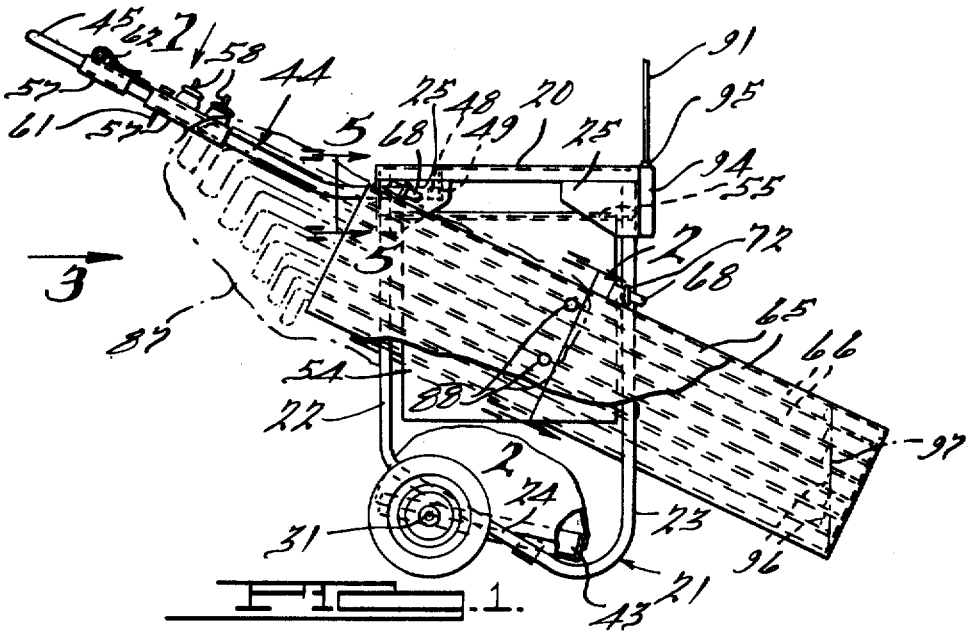
FIG. 1.
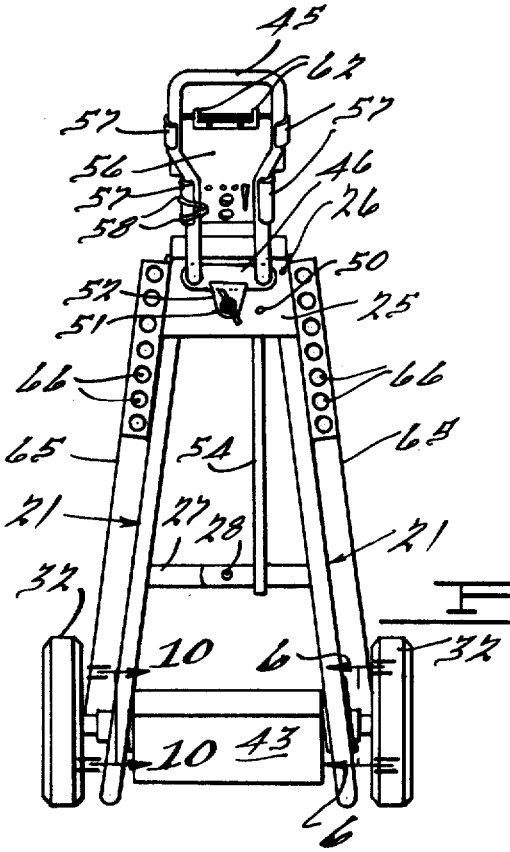
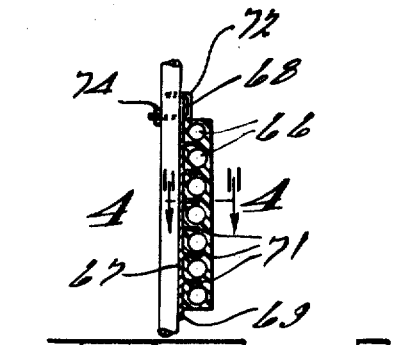
FIG. 2.
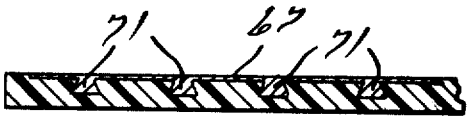
FIG. 4.
FIG. 3.
INVENTOR.
Ortie W. Dawson
BY
Norman Lidey & Pierce
ATTORNEYS.

GOLF CART

Original Filed Aug. 21, 1964

INVENTOR.
Ortic W. Dawson
BY
Harness, Dickey & Pierce
ATTORNEYS

GOLF CART

Original Filed Aug. 21, 1964

INVENTOR.
Ortie W. Dawson.
BY
Johnson, Dibby & Pierce
ATTORNEYS.

GOLF CART

Original Filed Aug. 21, 1964

INVENTOR.
Ortie W. Dawson
BY
Harness, Dickey & Pierce
ATTORNEYS

United States Patent Office

Re. 26,536
Reissued Mar. 4, 1969

26,536
GOLF CART

Orlie W. Dawson, Farmington Township, Wayne County, Mich. (31800 Nottingham Woods, Farmington, Mich. 48024)

Original No. 3,266,814, dated Aug. 16, 1966, Ser. No. 391,139, Aug. 21, 1964, which is a continuation of abandoned application Ser. No. 598,585, Nov. 18, 1966. Application for reissue Aug. 4, 1967, Ser. No. 672,405
U.S. Cl. 280—41 24 Claims
Int. Cl. B62d *21/14;* B62b *1/04, 7/06*

Matter enclosed in heavy brackets [ ] appears in the original patent but forms no part of this reissue specification; matter printed in italics indicates the additions made by reissue.

*ABSTRACT OF THE DISCLOSURE*

*The golf cart of the present invention comprises a seat which has a pair of supporting frames secured at each side at least one of which is pivotedly secured thereto. A handle is pivoted to the seat to fold with the frames to form a compact unit for storage. A golf club container is removably secured at opposite sides of the cart with the club receiving end extending upwardly. In addition to carrying the clubs the cart provides a sturdy seat which is always available.*

This invention relates to golf carts and particularly to a seat-type of golf cart which is collapsible for storage.

The golf cart of the present invention comprises a top element in the form of a seat and two supporting frames one of which is pivoted to move toward the other to reduce the size for storage. The bottom portion of the frames slope upwardly with the forward portion supporting a pair of wheels and the rear portion engageable with the ground. When the frames are spread apart at the bottom, the seat is in horizontal position, is unobstructed and at normal seat height so that the golfer may immediately sit thereon. A handle extends forwardly of the seat in separable relation therewith or pivoted thereto so as to swing downwardly in compact relation with the folded frames to form a small package when the cart is to be transported or stored. The handle is constructed from a tube in U-form having a plate thereon containing ball receiving apertures engageable by spring retaining fingers. The plate has rubber grommets for receiving and supporting tees and spring-press fingers for holding a score card and pencil. The clubs are supported in two detachable holders having a series of apertures of different lengths therein for the reception of the shafts of the golf clubs. The heads of the clubs are disposed in vertical alignment but in rearward staggered relation so as to be out of contact with each other at all times. The two club holders are removable and securable to each other to form a unit holder. The holder is provided with straps so that it can be carried in the hand or on the shoulder if the clubs are to be carried rather than transported on the cart. Provision is made on one of the holders for an umbrella and a socket is provided on the rear end of the seat for holding the umbrella thereover to protect the occupant from the rain or the sun.

Accordingly, the main objects of the invention are: to provide a cart which forms a sturdy seat and which folds into a small compact package; to provide a golf cart having a seat portion from which foldable frames extend for supporting a pair of wheels and detachable golf club holders; to provide a golf club holder made of two flat sections which are secured together in unit relationship having straps by which it may be carried by hand or on the shoulder; to provide a golf cart with a seat having foldable legs and removable or pivoted handle with removable golf club holders on each side and carrying bags beneath and at the end of the seat, and in general, to provide a seat-type golf cart with complete accessories, one which is simple in construction, and economical of manufacture.

Other objects and features of novelty of the invention will be specifically pointed out or will become apparent when referring, for a better understanding, of the following invention, to the following description taken in conjunction with the accompanying drawings, wherein:

FIGURE 1 is a view in elevation of a golf cart embodying features of the present invention;

FIG. 2 is an enlarged sectional view of the structure illustrated in FIG. 1, taken on the line 2—2 thereof;

FIG. 3 is a front view of the golf cart illustrated in FIG. 1, as viewed from point 3 thereof;

FIG. 4 is a sectional view of the structure illustrated in FIG. 2, taken on the line 4—4 thereof;

Figure 8:
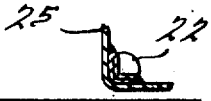
FIG. 8 is an enlarged broken sectional view of the structure illustrated in FIG. 5, taken on the line 8—8 thereof.

The seat-type golf cart of the present invention embodies a seat 20 having a pair of like U-shaped frames containing upright or leg portions 22 and 23 joined by a sloping web section 24. Angle shaped brackets 25 have one frame 22 welded thereto as illustrated in FIG. 8, the other frame 21 being pivoted to the brackets 25 by pivots 26. Pivoted cross links 27 retain the frames in predetermined distance apart, the ends of the links being pivoted to the leg portions 23 by pivots 28. When the links are folded upwardly, the pivoted frame 21 can be folded over against the fixed frame 22.

Figure 5:
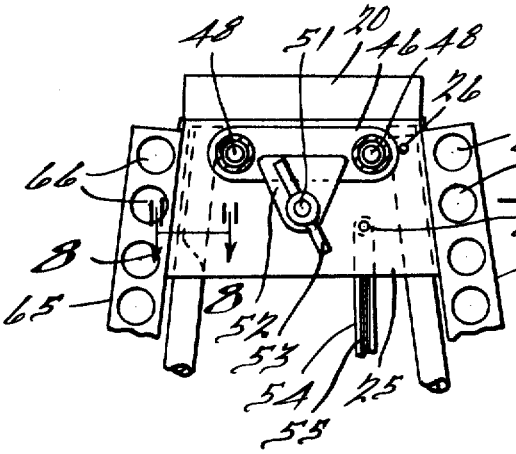
FIG. 5 is a sectional view of the structure illustrated in FIG. 1, taken on the line 5—5 thereof.
Figure 6:
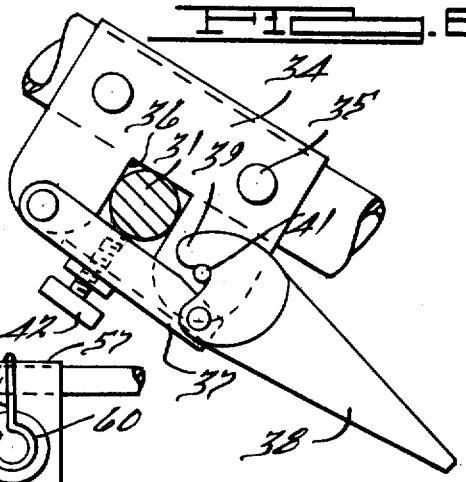
FIG. 6 is a sectional view of the structure illustrated in FIG. 3, taken on the line 6—6 thereof.
Figure 7:
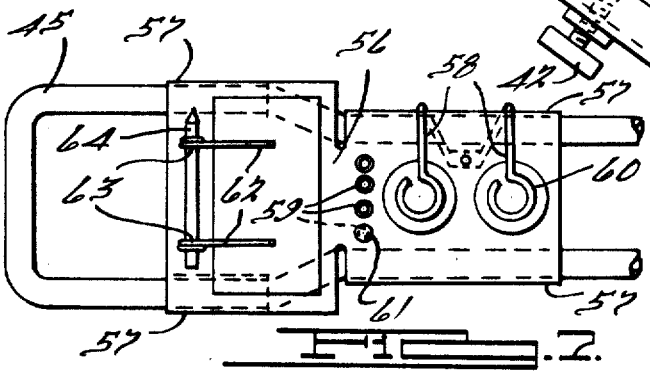
FIG. 7 is an enlarged broken view of the structure illustrated in FIG. 1, as viewed from point 7 thereof.
Figure 12:
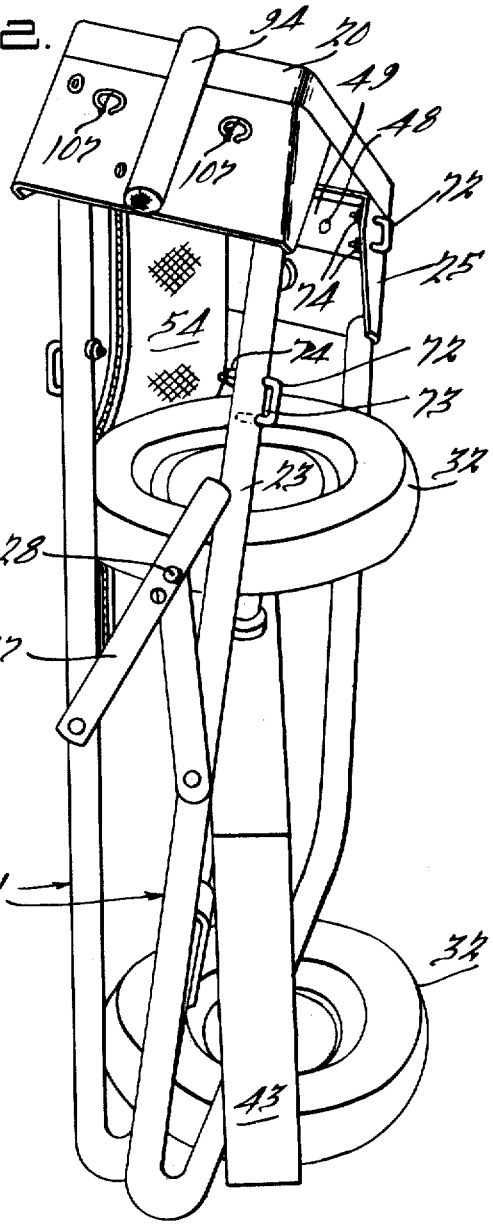
FIG. 12 is an enlarged view of the structure illustrated in FIG. 1 showing the cart in collapsed position.
Figure 10:
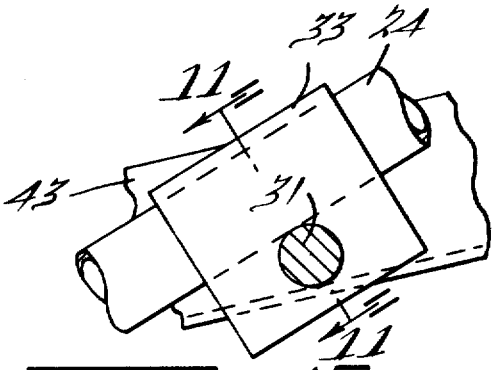
FIG. 10 is an enlarged broken sectional view of the structure illustrated in FIG. 3, taken on the line 10—10 thereof.
Figure 11:
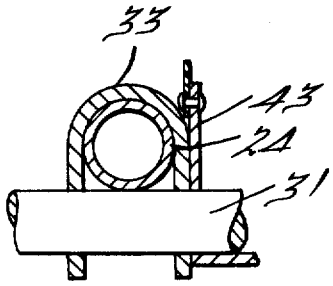
FIG. 11 is a sectional view of the structure illustrated in FIG. 10, taken on the line 11—11 thereof.

An axle 31 having a wheel 32 at each end is attached to the forward portion of the web sections 24 of the frames. The axle extends beneath the web sections 24 and, as illustrated more specifically in FIG. 10, is secured to one of the legs by a sleeve bracket 33 which permits the bracket and shaft to be revolved about the web sections 24. As illustrated in FIG. 6, a similar sleeve bracket 34 is secured to the opposite web section 24 preferably by rivets 35 so as to be in fixed relation thereto. The bracket has a notch 36 for receiving the axle 31 where it is locked in position by a link 37 secured by a handle 38 having a finger 39 engaging a pin 41 on the bracket. An adjusting screw 42 on the link 37 produces tight engagement of the axle in the notch of the bracket. Between the frames the axle has a pan 43 disposed thereon between the web sections 24 which swings with the axle when released by the finger 39 from the one web section 24 about the other section 24 270° to vertical position between the frames, as illustrated in FIG. 12.

A handle 44 is formed of a length of tube into U-shape having an enlarged handle portion 45. The free ends of the tube are spaced by a plate 46 to permit the ends to pass through a pair of apertures 47 in the front bracket 25. The tube ends extend over a pair of pins 48 mounted on a plate 49 supported across the inner end portions of the forward bracket 25. A stud 51 extends from the bracket 25 at the front of the cart and has a triangular plate 52 swingable thereon. A thumb screw 53 on the stud clamps the plate 52 against the plate 46 when tightened to retain the handle in locked position. Upon releasing the thumb nut 53 and permitting the plate 52 to have its heavy end swing downwardly, the plate 46 is released so that the handle can be withdrawn from the pins 48 and the bracket 25.

A bag 54 for the golfer's sweaters, balls, tees and the like is suspended on a rod 50 from the brackets 25 beneath the seat 20 with a zipper 55 or other closing means at the forward end thereof. The handle 44 has a plate 56 secured thereto as by the rolled flanges 57. Spherically flanged apertures receive golf balls 60 which are secured in position by spring fingers 57 extending from a web portion which is attached to the plate 56. Grommets 59 are secured in a row of apertures in the plate 56 for the reception of tees 61. Spring fingers 62 at the upper edge of the plate 56 secure a scoring card thereto, the fingers having loops 63 for supporting a pencil 64.

Figure 14:
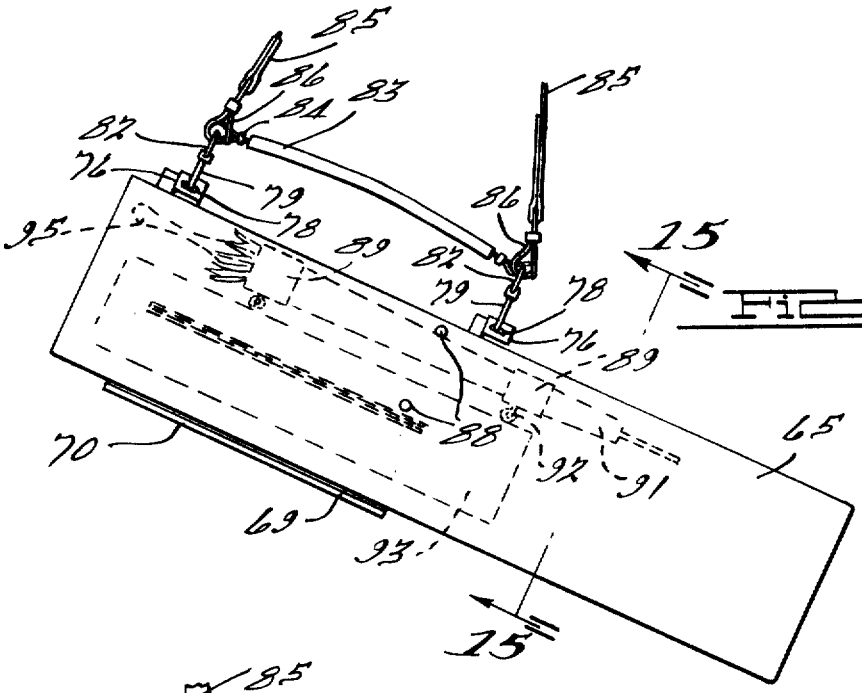
FIG. 14 is a view in elevation of a pair of the golf club holders when secured in unit relation to each other.
Figure 15:
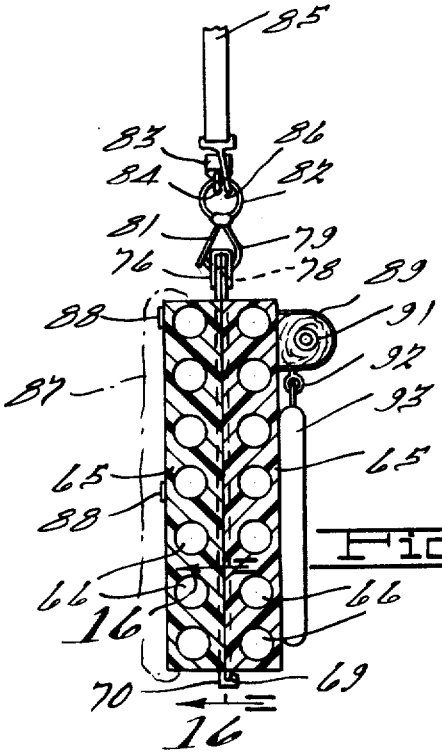
FIG. 15 is a sectional view of the structure illustrated in FIG. 14, taken on the line 15—15 thereof.
Figure 16:
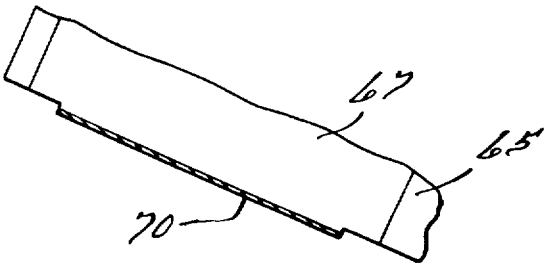
FIG. 16 is a broken sectional view of the structure illustrated in FIG. 15, taken on the line 16—16 thereof.

Golf club holders 65 are mounted on opposite sides of the frames 21 and 22 having a row of tubular apertures 66 therein for receiving and supporting the club shafts. While there are many ways of manufacturing the holder the one herein illustrated embodies the use of a metal plate 67 having aligned fingers 68 at the top edge and an extending flange 69 therebelow. One of the flanges is reversely bent to form a channel 70 for receiving the flange of the other plate for locking the bottom ends of the two holders together to form a bag when the golf clubs are to be carried by a caddy rather than by the cart. The plates have extending tongues 71 struck therefrom about which the plastic material of the holder is firmly secure. A pair of U-shaped clips 72 has the ends extending through apertures in the bracket 25 and in the upstanding leg portion 23. The inner ends are shouldered to space the web portion and form a slot 73 for the reception of the fingers 68, as clearly illustrated in FIG. 1 where each clip 72 is secured in position by a nut 74. The club holders 65 are readily removable from the cart and can be stored with or separately from the holders which can be employed separately or secured together and employed as a unit for carrying a portion or a full set of golf clubs. The unit holder is illustrated in FIGS. 14, 15 and 16 wherein each holder 65 is shown with the plates in abutted relation, with the bottom flange 69 disposed within the channel 70. Rectangular sleeves 76 extend over the two pairs of adjacent fingers 68 to clamp the top edge of the holders together. Apertures 78 extend through the sleeves 76 and the fingers 68 for the reception of a hook 79 having a locking spring finger 81 thereon. An eye 82 on the hook 79 supports a handle 83 between the fingers 68 by snap hooks 84 at each end of the handle. Similarly, a shoulder strap 85 has snap hook 86 on the ends which may also be secured to the eyes 82. The left hand side of the holder illustrated in FIG. 15 has a cover for the heads of the extending clubs, secured on releasable clips 88 which permits the cover to be extended, as illustrated in dot and dash line in FIG. 1, over the heads of the clubs to keep them clean and protect them from rain. Spaced slings 89 are secured on the right hand holder 65, as illustrated in FIG. 14, for receiving an umbrella 91 which is carried thereby. The slings have eyes 92 thereon to which a carrying bag 93 is removably secured. The rear bracket 25 carries a tube 94 which may be closed at the bottom by a pin screen or similar previous element, for supporting the handle 95 of the umbrella 91 when the umbrella is raised over the seat to protect the occupant from rain or from the sun.

The two holders 65 make a very compact unit which is carried by the handle 83 or the shoulder strap 85. The unit carries the umbrella, the cover for the heads of the clubs and the bag 93 for the golfing accessories. It will be noted in FIG. 21, that the club heads extend from the ends of the holders in longitudinal spaced relation to each other so that they can swing without striking each other and each can be removed when turned outwardly from the other aligned heads. It will be noted that the apertures 66 are foreshortened at the bottom, as illustrated in FIG. 1, by the stepped ends 96. The material at the end of the holders can be omitted by having the end terminate along the dot and dash line 97 to obtain the same stepped effect.

Figure 13:
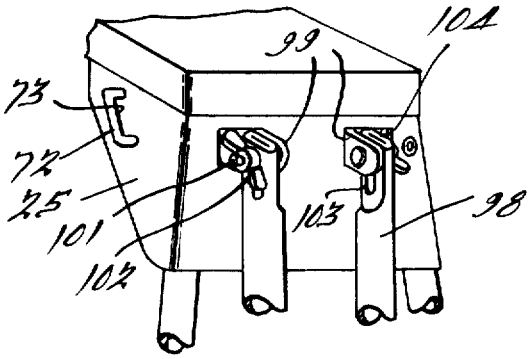
FIG. 13 is a broken sectional view of structure illustrated in FIG. 5 showing another form of support for the handle of the cart.

In FIG. 13 a handle 98 is illustrated, which is similar to the handle 44 hereinabove described, with the exception that tabs 99 have been struck from the front bracket 25 to which the ends of the handle are secured by a bolt 101 and thumb nut 102. Slots 103 are provided in the end of the handle so that when moved upwardly into carrying position the handle may be moved rearwardly into the aperture 104 remaining after the tabs 99 were struck from the bracket to thereby firmly lock the handle to the bracket when the thumb nuts 102 are tightened.

Figure 9:
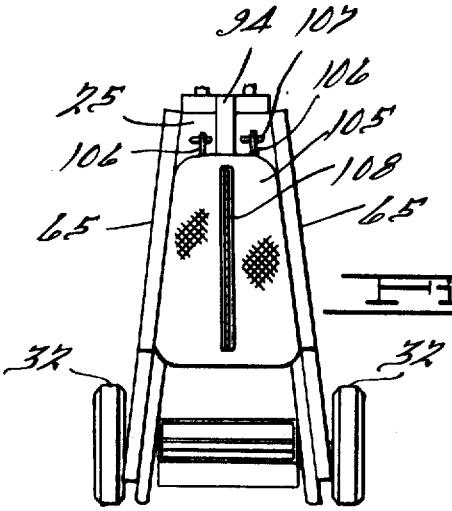
FIG. 9 is a rear view of the structure illustrated in FIG. 1 with a bag supported at the rear end of the seat.

As illustrated in FIG. 9, a carrying bag 105 has snap hooks 106 which engage slots on rings 107 on the rear bracket 25 to each side of the umbrella handle supporting tube 94. The rear wall of the bag 105 has a zipper 108 thereon so that the bag may be opened during the time the holders 65 are supported on the cart. The seat 20 may be made of wood or metal, or may be upholstered with foam rubber or the like to provide resiliency thereto for a deluxe type of cart.

As pointed out hereinabove, the cart is folded into a small package as illustrated in FIG. 12 with the holders 65 and handle 44 removed therefrom or with the handle 98 folded downwardly against the front leg portions of the cart supporting frames. The axle is illustrated as being swung 270° to a vertical position along with the pan 43 between the frames, one of which has been moved toward the other to provide a very compact package. The bag 54 is illustrated as having a zipper on the rear edge in addition to a zipper along the front edge so that the bag may be entered from either end. When the bag 105 is employed on the cart, then the bag 54 can only be entered from the front end.

What is claimed is:

1. In a golf cart, a seat, a pair of frame members supporting said seat, one of said frame members being secured in fixed relation to said seat, the other being pivoted thereto for swinging movement towards said first frame member, means on said frame means for supporting golf clubs, an axle secured to the forward edge of said frame members having a pair of wheels thereon, and means for releasing said axle means for permitting the one frame member to move toward the other frame member.

2. In a golf cart, a seat, a pair of frame members supporting said seat, one of said frame members being secured in fixed relation to said seat, the other being pivoted thereto for swinging movement towards said first frame member, means on said frame means for supporting golf clubs, an axle secured to the forward edge of said frame members having a pair of wheels thereon, means for releasing said axle means for permitting the one frame member to move toward the other frame member, and handle means secured to the forward end of the seat.

3. In a golf cart, a seat, a pair of frame members supporting said seat, one of said frame members being secured in fixed relation to said seat, the other being pivoted thereto for swinging movement towards said first frame member, means on said frame means for supporting golf clubs, an axle secured to the forward edge of said frame members having a pair of wheels thereon, means for releasing said axle means for permitting the one frame member to move toward the other frame member, and handle means secured to the forward end of the seat, said handle means being movable into nested relation with said frame members when the members are secured together.

4. In a golf cart, a seat, a pair of frame members supporting said seat, one of said frame members being secured in fixed relation to said seat, the other being pivoted thereto for swinging movement towards said first frame member, means on said frame means for supporting golf clubs, an axle secured to the forward edge of said frame members having a pair of wheels thereon, means for releasing said axle means for permitting the one frame member to move toward the other frame member, and handle means secured to the forward end of the seat, said handle means being separable from said seat.

5. In a golf cart, a seat, a pair of frame members supporting said seat, one of said frame members being secured in fixed relation to said seat, the other being pivoted thereto for swinging movement towards said first frame member, means on said frame means for supporting golf clubs, an axle secured to the forward edge of said frame members having a pair of wheels thereon, means for releasing said axle means for permitting the one frame member to move toward the other frame member, and handle means secured to the forward end of the seat, said handle means being pivoted to said seat.

6. In a golf cart, a seat, a pair of frame members supporting said seat, one of said frame members being secured in fixed relation to said seat, the other being pivoted thereto for swinging movement towards said first frame member, means on said frame means for supporting golf clubs, an axle secured to the forward edge of said frame members having a pair of wheels thereon, means for releasing said axle means for permitting the one frame member to move toward the other frame member, handle means secured to the forward end of the seat, said handle being of U-shape, and a plate secured across said U-shape handle having means thereon for supporting a score card.

7. In a golf cart, a seat, a pair of frame members supporting said seat, one of said frame members being secured in fixed relation to said seat, the other being pivoted thereto for swinging movement towards said first frame member, means on said frame means for supporting golf clubs, an axle secured to the forward edge of said frame members having a pair of wheels thereon, means for releasing said axle means for permitting the one frame member to move toward the other frame member, handle means secured to the forward end of the seat, said handle being of U-shape, and a plate secured asross said U-shape handle having means thereon for supporting a score card, and a socket on the rear end of said seat for supporting an umbrella.

8. In a golf cart, a seat, a pair of frame members supporting said seat, one of said frame members being secured in fixed relation to said seat, the other being pivoted thereto for swinging movement towards said first frame member, and means on said frame members for supporting golf clubs, each said golf club supporting means on said frame members embodying a holder having a series of vertically aligned apertures therein of different lengths for receiving the shafts of the golf clubs in a manner to maintain the club heads in spaced relation to each other.

9. In a golf cart, a seat, a pair of frame members supporting said seat, one of said frame members being secured in fixed relation to said seat, the other being pivoted thereto for swinging movement towards said first frame member, means on said frame members for supporting golf clubs, each said golf club supporting means on said frame members embodying a holder having a series of vertically aligned apertures therein of different lengths for receiving the shafts of the golf clubs in a manner to maintain the club heads in spaced relation to each other, and a cover on said holders capable of being drawn over the club head.

10. In a golf cart, a seat, a pair of frame members supporting said seat, one of said frame members being secured in fixed relation to said seat, the other being pivoted thereto for swinging movement towards said first frame member, and means on said frame members for supporting golf clubs, each said golf club supporting means on said frame members embodying a holder having a series of vertically aligned apertures therein of different lengths for receiving the shafts of the golf clubs in a manner to maintain the club heads in spaced relation to each other, said seat and frame members having eyes therein, fingers on said holders by which they are releasably supported on the cart.

11. In a golf cart, a seat, a pair of frame members supporting said seat, one of said frame members being secured in fixed relation to said seat, the other being pivoted thereto for swinging movement towards said first frame member, and means on said frame members for supporting golf clubs, each said golf club supporting means on said frame members embodying a holder having a series of vertically aligned apertures therein of different lengths for receiving the shafts of the golf clubs in a manner to maintain the club heads in spaced relation to each other, said seat and frame members having eyes therein, and fingers on said holders by which they are releasably supported on the cart, a handle having a socket at each end for receiving the fingers of one or both holders when the clubs are to be carried thereby.

12. In a golf cart, a seat, a pair of frame members supporting said seat, one of said frame members being secured in fixed relation to said seat, the other being pivoted thereto for swinging movement towards said first frame member, and means on said frame members for supporting golf clubs, each said golf club supporting means on said frame members embodying a holder having a series of vertically aligned apertures therein of different lengths for receiving the shafts of the golf clubs in a manner to maintain the club heads in spaced relation to each other, said seat and frame members having eyes therein, and fingers on said holders by which they are releasably supported on the cart, and a handle having a socket at each end for receiving the fingers of one or both holders when the clubs are to be carried thereby, means for locking the opposite edges of the two holders together when both holders are to be carried when in adjacent relationship.

13. In a golf cart, a seat, a pair of frame members supporting said seat, one of said frame members being secured in fixed relation to said seat, the other being pivoted thereto for swinging movement towards said first frame member, and means on said frame members for supporting golf clubs, each said golf club supporting means on said frame members embodying a holder having a series of vertically aligned apertures therein of different lengths for receiving the shafts of the golf clubs in a manner to maintain the club heads in spaced relation to each other, said seat and frame members having eyes therein, and fingers on said holders by which they are releasably supported on the cart, and a handle having a socket at each end for receiving the fingers of one or both holders when the clubs are to be carried thereby, and means for locking the opposite edges of the two holders together when both holders are to be carried when in adjacent relationship, and a strap attachable to said sockets by which the holder may be carried on the shoulder.

14. In a golf cart, a seat, a frame at each side of the seat, one frame being fixed to one edge of the seat, the other frame being pivoted to the other edge thereof, the bottom portion of the frames sloping upwardly toward the front, wheels supported on the front bottom portion of the frames, a handle on the front portion of the seat.

15. In a golf cart, a seat, a frame at each side of the seat, one frame being fixed to one edge of the seat, the other frame being pivoted to the other edge thereof, the bottom portion of the frames sloping upwardly toward the front, wheels supported on the front bottom portion of the frames, and a handle on the front portion of the seat, means for mounting said wheels on said frames in a manner to permit them to swing relative thereto so that the one frame is free to move relative to the other frame.

16. In a golf cart, a seat, a frame at each side of the seat, one frame being fixed to one edge of the seat, the other frame being pivoted to the other edge thereof, the bottom portion of the frames sloping upwardly toward the front, wheels supported on the front bottom portion of the frames, and a handle on the front portion of the seat, and means for mounting said wheels on said frames in a manner to permit them to swing relative thereto so that the one frame is free to move relative to the other frame, eyes on said frame and seat at each side thereof, holder for clubs having fingers which are received by said eyes for releasably retaining the holders on the frames.

17. In a golf cart, a seat, a frame at each side of the seat, one frame being fixed to one edge of the seat, the other frame being pivoted to the other edge thereof, the bottom portion of the frames sloping upwardly toward the front, wheels supported on the front bottom portion of the frames, and a handle on the front portion of the seat, and means for mounting said wheels on said frames in a manner to permit them to swing relative thereto so that the one frame is free to move relative to the other frame, eyes on said frame and seat at each side thereof, holder for clubs having fingers which are received by said eyes for releasably retaining the holders on the frames, and a bag for carrying accessories supported below the seat between the frames.

18. In a golf cart, a seat, a frame at each side of the seat, one frame being fixed to one edge of the seat, the other frame being pivoted to the other edge thereof, the bottom portion of the frames sloping upwardly toward the front, wheels supported on the front bottom portion of the frames, a handle on the front portion of the seat, and means for mounting said wheels on said frames in a manner to permit them to swing relative thereto so that the one frame is free to move relative to the other frame, eyes on said frame and seat at each side thereof, and holder for clubs having fingers which are received by said eyes for releasably retaining the holders on the frames, and a bag releasably supported at the rear end of the frame between the holders.

19. In a golf cart, a seat, a frame at each side of the seat, one frame being fixed to one edge of the seat, the other frame being pivoted to the other edge thereof, the bottom portion of the frames sloping upwardly toward the front, wheels supported on the front bottom portion of the frames, and a handle on the front portion of the seat, and a pan of shallow depth supported between the frames on said wheel supporting means.

*20. In a golf cart, a seat, a pair of frame members of U-shape supporting said seat, one of said frame members being pivoted relative to the side of said seat for relatively swinging movement toward the other frame member at the opposite side of the seat, the bottom portion of said frame members having a rear ground engaging portion and a front portion offset upwardly therefrom, wheels supported on the front bottom portion of the frame members which move toward each other when the bottom of the frame members are relatively moved toward each other, and a handle at the front of said seat.*

*21. In a golf cart as recited in claim 20, wherein a pair of holders for golf clubs are provided for the cart, and means for securing the holders on opposite sides of the cart.*

*22. In a golf cart as recited in claim 21, wherein the holders are disposed at an angle to the seat to extend upwardly at the front end of the cart.*

*23. In a golf cart as recited in claim 22, wherein the handle means is secured in pivotal relationship to the forward end of the seat.*

*24. In a golf cart as recited in claim 20, wherein releasable means secures the frames in spread apart position.*

References Cited

The following references, cited by the Examiner, are of record in the patented file of this patent or the original patent.

UNITED STATES PATENTS

| | | | |
|---|---|---|---|
| 2,858,140 | 10/1958 | Stamp | 280—36 |
| 2,957,700 | 10/1960 | Beaurline | 280—36 |
| 3,191,957 | 6/1965 | Meiklejohn | 280—36 |
| 3,197,226 | 7/1965 | Erlinder | 280—36 |
| 2,857,168 | 10/1958 | Neaverson et al. | 280—36 |
| 2,918,297 | 12/1959 | Peters | 280—42 |
| 3,165,330 | 1/1965 | Cotton | 280—41 |

LEO FRIAGLIA, *Primary Examiner.*

L. D. MORRIS, Jr., *Assistant Examiner.*